April 30, 1963 W. YOUNG 3,087,738
GEAR CHUCK
Filed Sept. 12, 1960 3 Sheets-Sheet 3
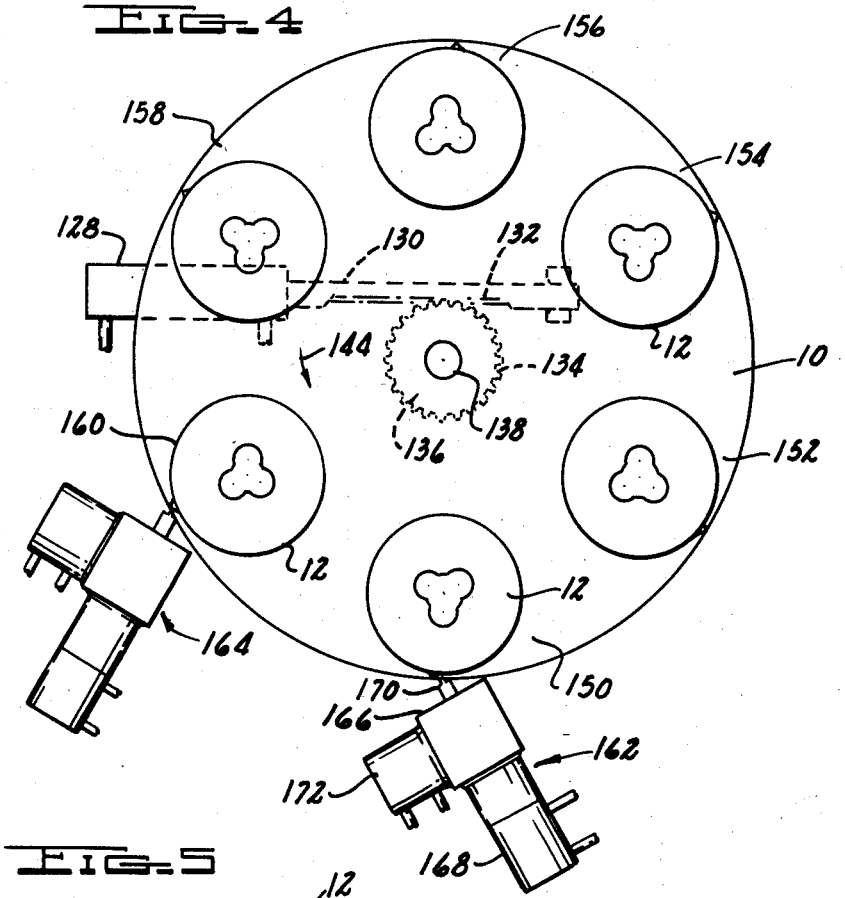
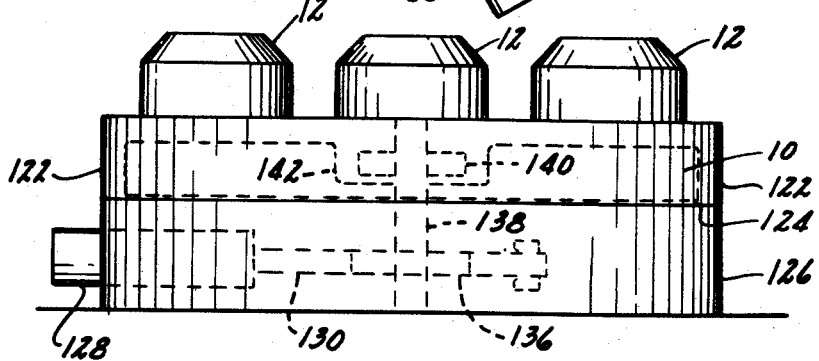
INVENTOR.
WILLIAM YOUNG
BY
WILSON, SETTLE, McRAE & CRAIG
ATTORNEYS

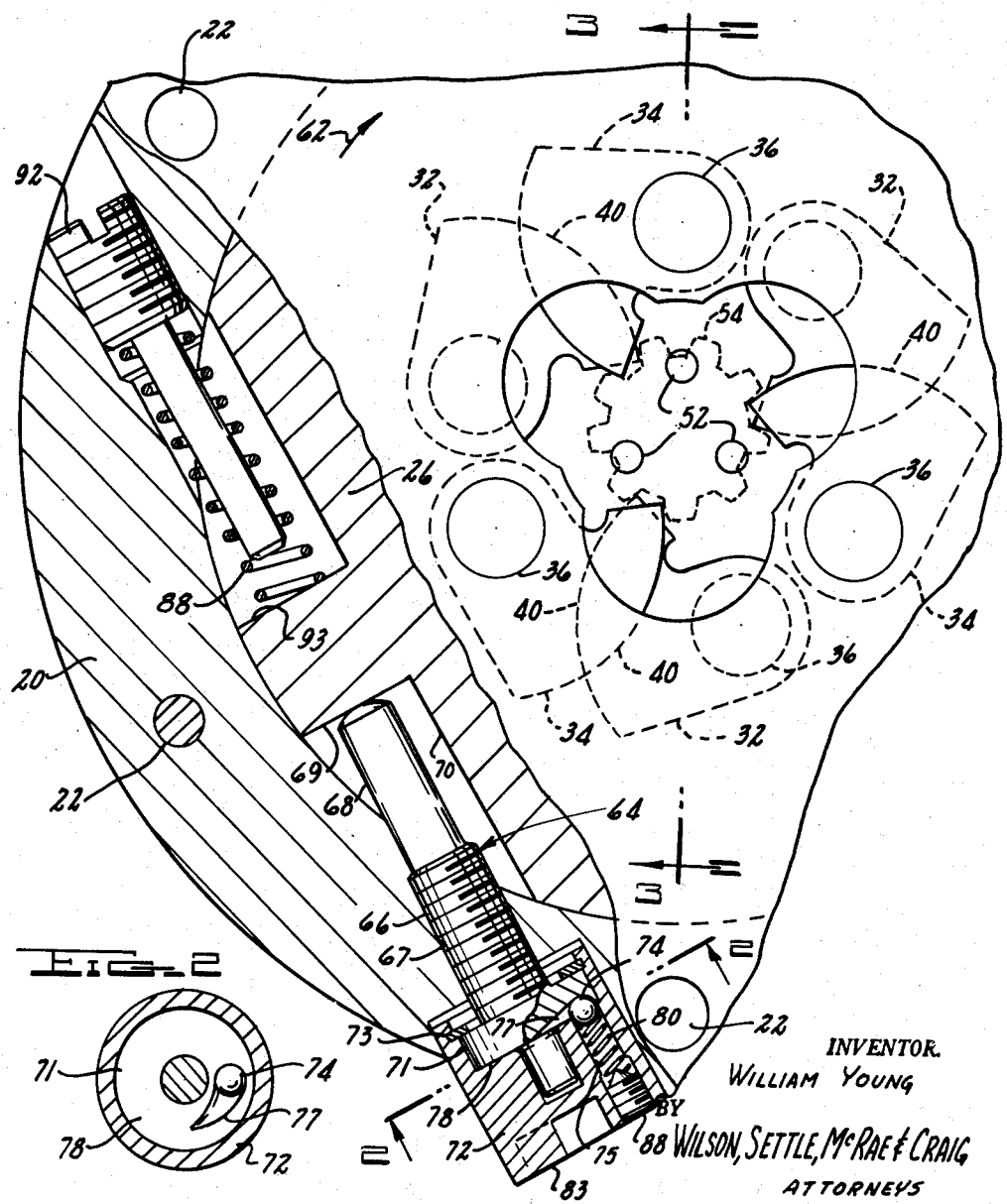

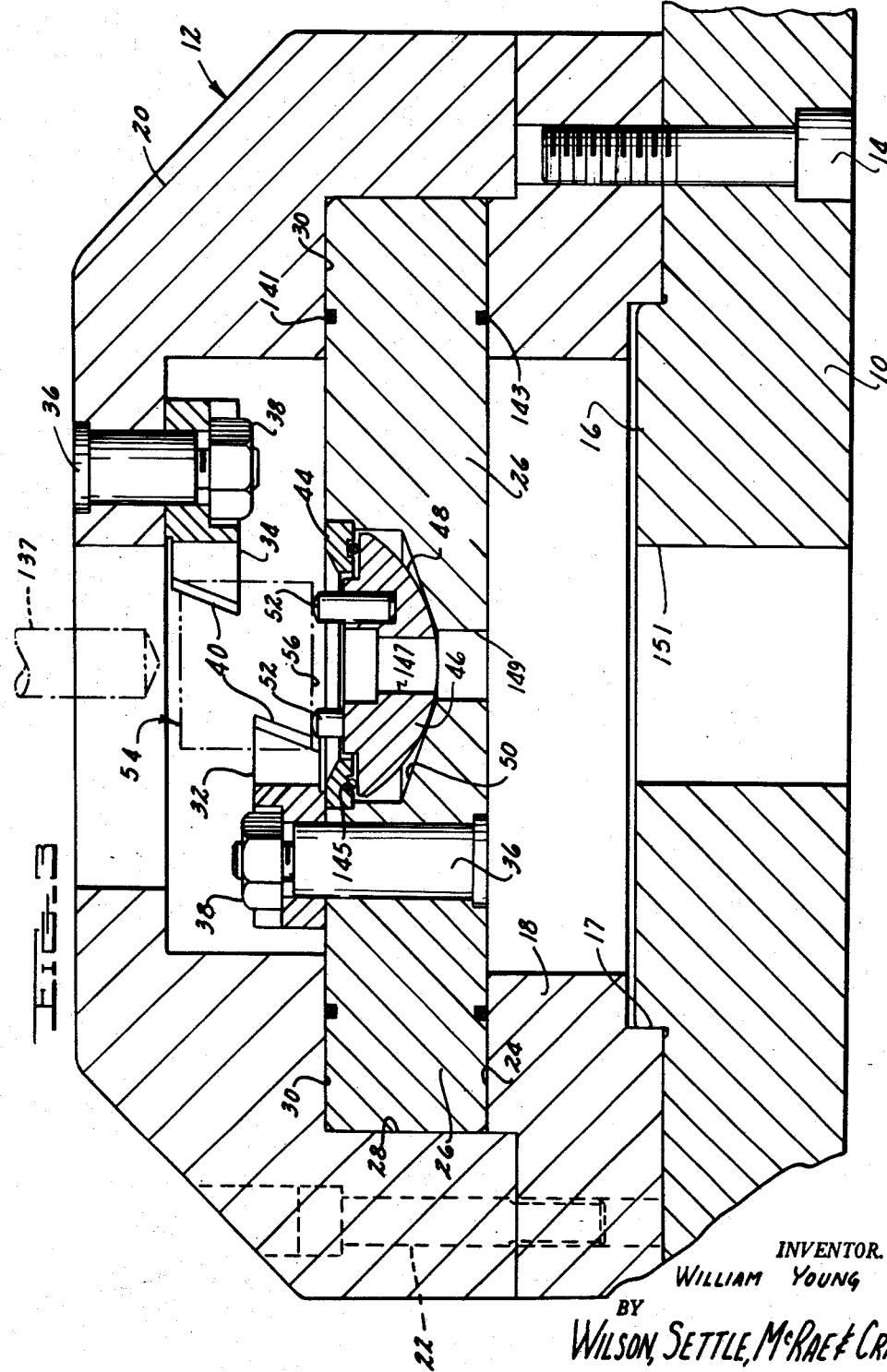

United States Patent Office 3,087,738
Patented Apr. 30, 1963

3,087,738
GEAR CHUCK
William Young, Farmington, Mich., assignor to Le Maire
Tool & Manufacturing Company, Dearborn, Mich.
Filed Sept. 12, 1960, Ser. No. 55,219
7 Claims. (Cl. 279—9)

This invention relates to a mechanism for the expeditious handling and clamping of work in fixtures to permit accurate machining of surfaces thereon. The invention has particular application in the precision finishing of gears, such as helical gears and spur gears; however certain features of the invention have application to other types of work.

In the finishing of gears in some instances the gear teeth surfaces are formed prior to formation of the gear center hole, and the teeth surfaces are engaged by a clamping fixture during drilling and finishing of the center hole. In precision work it is of the utmost importance that the center hole through the gear be exactly concentric with respect to the pitch line of the gear; otherwise the gear will not properly mesh with its mating gear when it is put into service.

The requirement for accurate formation of the center hole through the gear necessitates precision location of the gear in its fixture at the time that the axial hole is drilled, reamed, honed, etc. Accordingly it is desirable that the gear-clamping fixtures be so designed and constructed as to have satisfactory contact with the gear surfaces while the gear is being drilled, reamed, etc. Satisfactory pressure contact between the fixture surfaces and the gear surfaces can be achieved by forming the fixture with two relatively rotatable discs or plates, and by equipping each of the discs with a series of gripper elements operative to engage the surfaces of the gear teeth with a clamping pressure thereon when the two discs have been correspondingly adjusted with respect to one another. The gripper elements preferably have an engagement with the teeth surfaces along a line perpendicular to the line of action which is tangent to the base circle, and which intersects the pitch diameter of the gear teeth; by this arrangement the gripping pressures of the grippers are directed in the same direction that is later encountered in service, i.e., the direction of action of meshing surfaces of two mating gears. The arrangement of fixture and clamped gear is such that the center hole machining operations can be accurately directed with respect to the operative load surfaces of the gear, to thereby form a gear having desired features of quietness and long service life.

The rotary discs of the above-mentioned fixture are adjusted between clamped and unclamped positions by means of a mechanically-powered thrust means operating in opposition to a spring device, the arrangement being such that movement of the thrust means is effective to advance one of the discs in a rotary path relative to the other disc so as to cause the gear gripper elements to increase the pressure of their engagement with the gear teeth surfaces. The design of the fixture and its components is such that the thrust means operates in conjunction with the spring means to apply a predetermined pressure on the gear teeth surfaces. The action is such that even though the mechanical force is continued to be applied to the thrust means after attainment of the desired gripping pressure, yet no excessive pressure will be developed on the gear teeth surfaces, since the thrust means is particularly designed to incorporate a clutch or slip friction connection therein for preventing the pressure from rising above a predetermined value. By this arrangement the gear teeth surfaces are maintained unmarred and free from scratches, depressions, or other flaws.

The above-described advantages are preferably incorporated in an arrangement wherein the gears are quickly loaded and unloaded from the fixture, and wherein the machining operations are automatically performed thereon in a predetermined pattern and cycle of operations. The general objective is of course to obtain precision gears with a minimum amount of manual handling and with a minimum time period required for each of the machining operations.

This general objective is obtained by arranging a series of gear-gripping fixtures on an indexable support structure having a cycle of movement through a series of cutting and handling stations. The general arrangement is such that during the indexing movement of the support structure one of the fixtures is moved into a position for loading of a gear therein, others of the fixtures are moved into various cutting stations to have work performed on the clamped gears, and another fixture is moved into an unloading station.

Gear production in present day operations is preferably relatively high for cost reduction purposes, and preferably therefore the fixtures are automatically clamped and unclamped from the work by power devices. In one embodiment of the present invention such power devices take the form of a pair of torque wrenches, one being positioned at the loading station to clamp the gear in the fixture, and the other being located in the unloading station to release the fixture from the work. The operation of the torque wrenches is controlled in accordance with the indexing movement of the support structure so that unloading and loading of certain gears can take place simultaneously while work is being performed on the gears clamped in other fixtures. By the arrangement very high production of finished gears is possible. The invention does not presume to set a limit on permissible production achieved, but as an illustrative example a rate of production of several hundred gears per hour is feasible with structures of the present invention.

A primary object of the present invention is to provide apparatus whereby gears may be accurately finished in a minimum period of time.

A further object of the invention is to provide apparatus whereby gears may be rapidly and easily loaded into and unloaded from clamping means to facilitate finishing operations thereon.

An additional object of the invention is to provide an arrangement wherein gears may be clamped in accurately located positions within mounting fixtures and held therein with a predetermined pressure such that precision location of the gears may be maintained under extreme cutting and vibrational forces without danger of surface marring of the gears, particularly on their teeth.

A further object of the invention is to provide a fixture for the clamping of gears wherein a simplified arrangement of parts is employed, with the parts being particularly designed to have freedom from tendency to jam or otherwise malfunction in service.

A further object of the invention is to provide a clamping fixture which may have a relatively high speed of rotation without any imbalance conditions such as would set up harmful vibrations or pulsating effects.

Other objects of this invention will appear in the following description and appended claims, reference being had to the accompanying drawings forming a part of this specification wherein like reference characters designate corresponding parts in the several views.

In the drawings:

FIGURE 1 is a top plan view of a portion of a clamping fixture constructed according to the present invention, with parts thereof shown in section for illustration purposes:

FIG. 2 is a fragmentary sectional view taken on line 2—2 in FIG. 1;

FIG. 3 is a sectional view taken substantially on line 3—3 in FIG. 1;

FIG. 4 is a top plan view of a rotary index table having a plurality of fixtures thereon constructed as shown in FIGS. 1 and 3; and FIG. 5 is an elevational view of the table shown in FIG. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIG. 3, there is shown a portion of an index table 10 having a gear-clamping fixture 12 of the present invention secured thereon, as for example by means of the bolts 14. The table is provided with a locating boss 16 which snugly fits within a recess 17 formed by the annular mounting plate 18 for the clamping fixture 12.

The mounting plate 18 fixedly carries on its upper face a housing member 20, the fixed connection between members 18 and 20 being effected by means of the bolts 22. By reference to FIG. 3 it will be seen that mounting plate 18 is provided with a machined surface 24 which engages the lower machined face of a rotatably adjustable disc or plate 26. The peripheral edge portion of rotatable disc 26 is engaged with a machined surface 28 formed by the housing element 20, said housing element having also a machined surface 30 for engaging the upper face of plate 26. The arrangement of surfaces 24, 28 and 30 is such that plate 26 is held in an accurately predetermined position within the fixture, i.e., in a position allowing only rotational movement of plate 26 about the centerline of the fixture.

Plate 26 and the housing element 20 form supporting devices for the opposed gripper members shown at 32 and 34. Each of these gripper members is fixedly but adjustably carried on its supporting structure by means of a stud 36 and nut 38, the axis of the nut being concentric with the gear-contacting surface 40 of the gripper member (FIG. 1) so that loosening of the nut 38 on the stud may be utilized to vary the position of the gripper member such as may be necessary after surface 40 has been worn by reason of extensive gear contact over a long service life. Thus, after wear of any of surfaces 40 the tip areas thereof may be ground off to present new portions of surfaces 40 to the work. In this manner the life of the fixture may be considerably prolonged.

Referring to FIG. 3 it will be seen that members 32 have portions thereof overlying the ring 44 which is suitably affixed to plate 26. Ring 44 overlies an annular member 46 which is provided with a spherical surface 48 engaged against a conical surface 50 formed as the bottom wall of a recess in plate 26.

Member 46 has embedded therein a plurality of pins 52 which extend upwardly within the space defined by the various grippers 32. These pins are so arranged that when work piece or gear 54 is inserted into the space between grippers 32 the end face 56 of the gear engages and rests against the pins 52. In some instances the character of the gear is such that end face 56 is not parallel to the plane of the gear pitch circle, and it is therefore not desirable to rely on the end surface 56 of the gear as a locating surface for positioning of the gear axis in the fixture. The illustrated device utilizes the grippers 32 and 34 for work-gripping purposes, and these grippers correspondingly act at the pitch diameter of the gear to lock the gear in a correct position, even if the gear end face 56 is not perfectly parallel to the plane of the pitch circle. Thus, if surface 56 is not parallel to the pitch circle plane the pins 52 will merely be contacted by the end face of the gear and will shift the spherical member 46 on the conical surface 50 until all of the pins 52 engage with the gear end face. The gear will thus be buttressed against any axial displacement by the axial forces of the cutting tool, but at the same time the gear will be properly located with respect to the grippers 32 and 34 such that the cutting operations will be performed concentrically with respect to the pitch diameter of the gear.

Positioning of the gear into the clamping fixture is performed with plate 26 rotated counterclockwise from the FIG. 1 position. In such position the inserted gear rests loosely between the grippers 32 and 34. However, by rotation of the plate 26 in the arrow 62 direction surfaces 40 of the grippers 32 press against the surfaces of the gear teeth to shift the gear slightly in a clockwise direction for increasing the contact pressure between the gear teeth surfaces and the surfaces 40. As will be apparent hereinafter, this contact pressure is accurately regulated by a control mechanism contained within the fixture 12 structure.

In order to effect movement of plate 26 in the arrow 62 direction there is provided the thrust means indicated generally by numeral 64 (FIG. 1). In the illustrated embodiment this thrust means includes a stud portion 66 threaded into a tapped hole 67 in the periphery of housing element 20. Stud portion 66 carries a stem 68 which registers with an abutment surface 69 formed by a recess 70 extending inwardly from the peripheral edge of plate 26.

Stud portion 66 is carried on a cylindrical disc portion 71 which is rotatably journalled within the cylindrical barrel 72. A retainer ring 73 is provided to prevent axial separation of the disc and barrel.

In the FIG. 1 position of parts the disc portion 71 is locked against rotation relative to barrel 72 by means of a ball element 74. As will be seen from FIG. 1 the ball is seated partly within a bore 75 in barrel 72 and partly within a cam track 77 formed in the end face 78 of disc portion 71. As viewed in FIG. 2 the cam track is located on an arc taken around the axis of rotation of disc portion 71. As viewed in FIG. 1 the cam track has its bottom wall inclined or angled with respect to disc surface 78.

In the illustrated embodiment the ball element is yieldably urged to its position on the cam track by means of a compression spring 80 which is seated against an adjustment screw 82. The screw 82 is initially adjusted to provide a desired loading on spring 80 so that when a turning force is applied to barrel 72 the ball 74 remains locked to track 77 at low frictional drag values between the thread surfaces at 66 and 67; when the frictional drag rises above the predetermined value the ball 74 is caused to be forced out of the cam track. This predetermined value is variable in the sense that it can be changed by suitable adjustment of screw 82.

The adjustment of screw 82 conditions the FIG. 1 mechanism for clamping work piece 54 in place between the various clamping surfaces 40. Thus, after work piece 54 has been loosely positioned in the space designated in FIGS. 1 and 3 a turning force may be applied to barrel 72 (as by means of the torque wrench 162 shown in FIG. 4). In order to permit application of the turning force to the barrel said barrel may be provided with lug means, as at 83 (FIG. 1).

The application of a turning force to barrel 72 causes the barrel and stud 66 to initially rotate as a unit (since ball 74 locks them together). As a result the stud 66 is threaded into the tapped hole 67, and the stem 68 presses against surface 69 for thereby rotating plate 26 in the arrow 62 direction. This action causes the work 54 to be clamped between the opposing surfaces 40.

As the turning force is continued to be applied to barrel 72 the clamping pressure on the work surfaces creates a resistance to continued rotation of plate 26 in the arrow 62 direction; the plate is thereby slowed down and/or completely halted. When the rate of advancement of stem 68 (by the threading-in movement of stud 66) is greater than the rate of movement of plate 26 in the arrow 62 direction a backwardly-acting axial load is created on stem 68 by reaction from surface 69. The thread surfaces on stud 66 thereby are forced more tightly against the thread surfaces of tapped hole 67 so that portion 71 tends to slip relative to barrel 72. Tendency of the barrel to rotate on portion 71 tends to cause ball 74 to ride up on the inclined surface of cam track 77 and thence onto the face 78. The ball is of course at all times locked to barrel 72 by its disposition in bore 75. The general arrangement is such that barrel 72 may be rotated to clamp work 54 in place, after which continued barrel rotation is ineffective to transmit further movement to stem 68 or plate 26.

It will be seen that the clamping pressure on the work is indirectly controlled by the loading on spring 80 as determined by the adjustment of screw 82. The heavier the loading on spring 80 the greater will be the axial force on stem 68 necessary to cause slipping of the barrel on thrust portion 71. Conversely, with a very weak loading of spring 80 the barrel will slip on thrust portion 71 in response to a relatively small frictional drag from the threads at 66, 67. The spring 80 will of course be adjusted in accordance with different characteristics of the work piece, as for example work piece material, work piece size, or type of machining operation to be performed thereon.

While the spring 80 controls the clamping pressure on the work, yet the spring is not located in direct opposition to the work piece-disturbing forces. Thus, during machining operations on the work piece the threaded surfaces of portion 66 and hole 67 receive the impact of the machining forces, with a positive abutment action. In this manner the desired clamping pressure is maintained without fluctuations as might otherwise occur. The clamping fixture is so designed that clockwise torque forces produced by machining operations are resisted by studs 36 in the fixed member 20.

When it is desired to unclamp the work the barrel 72 is given a reverse rotation from that described above. By this action the ball 74 is moved into the deepest portion of the cam track such that it transmits a positive drive to portions 71, 66 and 68. The actual unclamping movement of plate 26 is obtained from a compression spring 88 which acts between a seat-forming screw 92 and abutment surface 93.

With further reference to FIG. 1, it will be seen that in the clamping position surface portions 40 of the grippers will be engaged with the gear teeth surfaces on a line lying on the cylinder of the pitch diameter of the gear. Further it will be noted that the mounting axis for each gripper (at stud 36) is perpendicular to the line of action defined by the tangent on a line of action extending to the base circle which intersects the pitch circle at the surface of the gear tooth. These lines of action are the lines of action which are encountered in actual service of the gear when it is put into an actual installation in mating engagement with its companion gear. Thus the gear is held in the fixture directly at the gear surfaces which will be operative when the gear is put into service, and machining operations on the other parts of the gear will therefore be precisely performed with respect to those surfaces of importance in service. In this connection it will be recalled that during the previous description it was pointed out that member 46 (FIG. 3) acts as a buttress for preventing axial shift of the gear while at the same time having no error-producing effect on gear teeth positioning, i.e., the grippers 32 and 34 are permitted to accurately locate the gear without any interference from member 46.

Under the present invention it is preferred to operate the clamping fixture as part of a system whereby the work is automatically cycled between various cutting stations for having such operations as drilling, reaming and milling automatically performed thereon. FIG. 4 illustrates one such arrangement for operatively utilizing the FIG. 1 fixture to permit high speed production of finished precision gears.

The FIG. 4 construction comprises an index table 10 having a peripheral flange 122 (FIG. 5) rotatably seating on a bearing structure 124 formed on the upper portion of the fixed base 126. The base carries a fluid cylinder 128 which is provided with a piston 130 having the rack teeth 132 formed thereon. These teeth mesh with the teeth 134 of a gear 136 carried by an upstanding shaft 138 suitably mounted in the base. The arrangement thus far described operates in such manner that introduction of pressure fluid into the left end of cylinder 128 is effective to drive the rack 132 to the right so as to rotate the gear 136 and shaft 138 in a clockwise direction. Conversely, introduction of pressure fluid into the right end of cylinder 128 drives rack 132 to the left so as to effect counterclockwise movement of the shaft 138. The upper end of shaft 138 carries the input member of a conventional overrunning clutch 140. The output from said clutch is suitably connected to the internal wall structure 142 formed on the index table 10. The clutch formation is such that during leftward movement of rack 132 the shaft 138 and the table 10 are rotated in a counterclockwise direction as indicated by arrow 144. During reverse movement of rack 132 the clutch components slip on one another and there is no movement of the table 10. During the period between successive leftward movements of rack 132 suitable shot pin means or other brake devices (not shown) are utilized to hold table 10 in a radial position.

It will thus be seen that the table can be shifted counterclockwise about its axis in timed discontinuous motions so as to provide alternate operating periods and indexing periods. As will be seen from FIG. 4, the table carries six of the previously described clamping fixtures 12. In the illustrated arrangement each of these clamping fixtures traverses six stations during its cycle of movement, and therefore each leftward stroke of rack 132 is designed to advance the fixtures through one-sixth of a revolution (i.e., sixty radial degrees with respect to the axis of shaft 138). The six stations in the illustrated embodiment comprise a gear loading station 150, a drilling station 152, a reaming station 154, an end facing station 156, a keyway milling station 158, and an unloading station 160. The drilling, reaming, milling and end facing operations can be performed by conventional tools and machines positioned in the spaces above the fixtures shown in FIG. 5, and these conventional cutting machines have not been illustrated in the drawings. FIG. 3 shows at 137 therein a conventional drill as it is about to enter the work piece to form the gear hole, and it will be understood that the reaming tool (at station 154) traverses the hole formed by the drill.

During the cutting operations conventional cutting fluids are employed, and it is desirable to so direct these fluids as to prevent the cuttings from clogging small joints in the fixture. Accordingly, as will be seen from FIG. 3, each fixture is preferably provided with the seals at 141, 143 and 145, the arrangement being such that the cutting fluid is confined to flow through the central passages 147, 149 and 151 without causing the cuttings to become trapped in relatively small clearance spaces between moving parts.

As previously explained, it is desirable in the interests of high speed operations to automatically clamp and unclamp the gears in the mounting fixtures prior to and after their having been acted on by the cutting machines. Accordingly, an automatic torque wrench is provided at 162 to clamp the fixtures onto the gears at the loading station, and a second torque wrench 164 is provided at the unloading station 160 to automatically unclamp the fixture grippers from the gear teeth surfaces to permit unloading of the gears. Each of the torque wrenches may be of the construction as more particularly shown in issued U.S. Patent 2,786,379 issued May 26, 1957, to R. C. Blackinton. Briefly, each of the wrenches comprises a housing 166 having secured thereto a fluid cylinder 168, the piston rod of which is adapted to impart axial motion to an output shaft 170. The output shaft is slidably keyed to a rotary gearing contained within housing 166, said gearing being more particularly shown in the above-mentioned patent to Blackinton. This internal gearing is driven from a rotary fluid motor 172, and by synchronous operation of the two power operators 168 and 172 the output member 170 may be driven with a screw-like motion. The end of the output shaft is suitably configured to releasably lock onto the noncircular recess 83 (FIG. 1) of barrel 72, the arrangement being such that during the screw-like movement of member 170 the screw 66 is advanced into the housing element 20 so as to apply the thrust to plate 26 for thereby causing the desired clamping contact pressure to be applied onto the gearing teeth surfaces at their pitch diameters as previously explained.

The torque wrench 164 may be of similar construction to the wrench 162, except of course that the direction of rotation of parts is such that the output member thereof advances away from the housing element 20 during operation so as to permit the internal spring 88 to drive plate 26 in the counterclockwise direction and thereby release the grippers from clamping engagement on the gear teeth surfaces.

In the illustrated arrangement the fixtures 12 are fixedly carried on the index table. However, in certain installations it is desirable that the fixtures be mounted for high speed rotary movement. In such cases the cutting tools may be stationary or may be rotated. In installations requiring rotational fixtures the rotary speeds are sometimes relatively high, as for example 700 r.p.m., or more, and at such rotational speeds there is a problem in balancing the components of the fixture so as to prevent undesirable vibrations such as would cause early parts failure. It will be noted from FIG. 1 that the fixture there shown is of generally symmetrical construction, with none of the parts tending to provide any substantial imbalance. Any imbalance as is occasioned by the presence of thrust means 64 can be alleviated by suitable weights where necessary. It will be appreciated that the FIG. 1 fixture could be modified so as to dispose barrel 72 completely within its periphery so as to prevent such projections as might interfere with adjacent structure during high speed rotation of the fixture.

The drawings illustrate particular arrangements, constructions, and features useful in a practical embodiment of the invention. However, it will be appreciated that variations and modifications thereof may be resorted to without departing from the spirit of the invention as set forth in the appended claims.

I claim:

1. In a gear holding chuck wherein a gear is gripped at the operating surfaces of the teeth for automatic alignment of the gear axis with the spindle of a machine tool, a housing, a first cavity in said housing defining a gear holding space, a first gear tooth gripper pivotally mounted to said housing within said cavity, a cylindrical cavity in said housing separate from said first cavity, a circular plate mounted for rotary movement in said cylindrical cavity, a second gear tooth gripper pivotally mounted to said circular plate and extending within said gear holding space to cooperate with said first gear tooth gripper and hold a gear, means for rotatably moving said circular plate within said cylindrical cavity to force said first and second gear tooth grippers into holding engagement with working surfaces of the teeth of said gear positioned in said gear holding space, and a rockable abutment carried by said circular plate and adapted to engage a face surface of said gear positioned in said gear holding space to support the gear in accurate axial alignment with the axis of said plate.

2. In a gear holding chuck adapted to grip a gear at the operating surfaces of the teeth for automatic alignment of the gear axis with the spindle of a machine tool, a housing, a first cavity in said housing defining a gear holding space, a first gear tooth gripper pivotally mounted to said housing within said gear holding space and adapted to engage one tooth surface of a gear positioned therein, a cylindrical cavity formed in said housing adjacent said gear holding space and separate from said first cavity, a circular plate mounted for rotary movement in said cylindrical cavity, a second gear tooth gripper pivotally mounted to said circular plate and extending within said gear holding space, said second gear tooth gripper being adapted to engage an opposite tooth surface of said gear positioned in said gear holding space, a rockable abutment carried by said circular plate and adapted to engage a face of said gear positioned in said gear holding space to support the gear in exact axial alignment with the axis of said plate, and means for rotatably moving said plate in said cylindrical cavity whereby the gear tooth gripper carried thereby is forced against one operating surface of a gear tooth and the gripper carried by said housing is forced against an opposite operating surface of a gear tooth to retain said gear in fixed exact coaxial alignment with respect to said plate.

3. The gear holding chuck defined in claim 2 wherein said gear has a center hole and said gear holding space is adapted to receive the cutter of a machine tool and a cutting fluid in operable relation to the center hole of said gear retained therein, a fluid conduit through said rockable abutment and out of said housing, and seal means between said circular plate and said cylindrical cavity and between said rockable abutment and said circular plate.

4. In a gear holding chuck adapted to grip a gear at the operating surface of the teeth and support the gear with the axis in exact alignment with the pitch line, a circular housing, a cavity within said housing defining a gear holding space, a first gear tooth gripper pivotally mounted to said housing within said gear holding space, said first gear tooth gripper having an arcuate face adapted to engage one working surface of a tooth of a gear positioned in said gear holding space, said arcuate face being oriented to extend in a first direction, a cylindrical cavity formed in said housing adjacent said gear holding space, a circular plate positioned in said cylindrical cavity and adapted for rotary movement therein, a second gear tooth gripper pivotally mounted to said circular plate and extending within said gear holding space, said second gear tooth gripper having an arcuate face adapted to engage an opposite working surface of a tooth of a gear positioned in said gear holding space, said arcuate face being oriented to extend in an opposite direction to said arcuate face of said first gripper, a hole concentrically of said plate and facing into said gear holding space, said hole having a conical bottom, a rockable abutment retainably positioned in said hole, said abutment having a spherical bottom surface engaging said conical bottom and adapted to swivel thereon, three pins extending in parallel alignment from the top surface of said abutment and into said gear holding space to engage a face of said gear positioned therein, and means for rotating said plate whereby the arcuate face of the gear tooth gripper carried thereby is forced against one operating surface of a gear tooth and the arcuate face of the gear tooth gripper carried by said housing is forced against an opposite operating surface of a gear tooth and said rockable abutment is simultaneously conformed to a face of said gear to position the gear in fixed exact coaxial alignment with respect to said plate.

5. In a gear holding chuck adapted to grip a gear at the operating surface of the teeth, a housing, a cavity in said housing defining a gear holding space, a first gear tooth gripper pivotally mounted to said housing within said cavity, a cylindrical cavity in said housing adjacent said gear holding space, a circular plate positioned in said cylindrical cavity for rotary movement therein, a second gear tooth gripper pivotally mounted on said circular plate to extend within said gear holding space to cooperate with said first gripper to hold a gear in working position in said space, a rockable abutment carried by said circular plate and adapted to engage a face of said gear positioned in said gear holding space to support the gear in exact axial alignment with the axis of said plate, and means for imparting rotary movement to said circular plate, comprising an abutment on said circular plate, a threaded hole in said housing, a threaded stud positioned in said threaded hole and having a stem adapted to engage said abutment, a disc formed on said stud, a barrel surrounding said disc in rotatable relation, a cam track on said disc, a hole in said barrel aligned with said cam track, a ball carried by said cam track and said hole, and adjustable means urging said ball against said cam track, whereby rotation of said barrel is adapted to turn said stud into said housing hole so that said stem pushes said circular plate in rotatable moving manner to a torque predetermined by said adjustable ball urging means.

6. The gear holding chuck defined in claim 5, wherein said adjusting means urging said ball against said cam track comprises a spring behind said ball in said hole of said barrel and a screw behind said spring adapted to be turned into said hole to vary the compression of said spring.

7. In a gear holding chuck,
a housing,
a first cavity in said housing defining a gear holding space,
a first gear tooth gripper pivotally mounted to said housing and within said cavity,
a second cavity in said housing separate from said first cavity,
a plate movably mounted in said second cavity,
a second gear tooth gripper pivotally mounted to said plate and extending within said first cavity to cooperate with said first gripper to hold a gear,
means for moving said plate to force said first and second grippers into holding engagement with working surfaces of said gear positioned in said first cavity,
and a rockable abutment carried by said plate to engage a face surface of said gear to support the gear in axial alignment with the axis of said plate.

References Cited in the file of this patent

UNITED STATES PATENTS

| | | |
|---|---|---|
| 2,045,156 | Matchett | June 23, 1936 |
| 2,354,816 | Klomp | Aug. 1, 1944 |
| 2,678,824 | Parker et al. | May 18, 1954 |
| 2,729,134 | Stanton et al. | Jan. 3, 1956 |
| 2,904,339 | Swanson et al. | Sept. 15, 1959 |